Dec. 3, 1968 R. E. PROUTY 3,414,789
SOLID-STATE MOTOR STARTING CIRCUIT
Filed May 24, 1966

INVENTOR
ROBERT E. PROUTY
BY Dair, Freeman & Molinare
Attys.

United States Patent Office 3,414,789
Patented Dec. 3, 1968

3,414,789
SOLID-STATE MOTOR STARTING CIRCUIT
Robert E. Prouty, Logansport, Ind., assignor to Essex Wire Corporation, Fort Wayne, Ind., a corporation of Michigan
Filed May 24, 1966, Ser. No. 552,527
3 Claims. (Cl. 318—221)

ABSTRACT OF THE DISCLOSURE

A control circuit employing an integrated, multifunction semiconductor device for controlling the flow of current through the start winding of a split-stator induction motor. A current sensing resistor connected in series with the main (or "run") winding of the motor produces an AC voltage drop whose magnitude is proportional to the magnitude of current flowing in the main winding. A single-phase diode bridge rectifier circuit is employed to convert this current-related AC voltage into a DC control signal whose magnitude varies in direct relation to the current in the main winding. This DC control signal is applied directly to the control electrode of the semiconductor switch which is in turn connected in series with the start winding.

Background of the invention

This invention relates to control circuits for electric machines and more particularly to an improved starting circuit for a single-phase induction motor.

A conventional, single-phase induction motor includes two stator windings, one of which is energized only while the rotor is being brought up to speed. This additional starting or "phase" winding is included since the main winding, by itself, does not contribute torque to the rotor until rotation begins. It is a conventional practice, therefore, to energize both windings until the desired rotational speed is reached, whereupon the starting winding is disconnected from the power source.

In recent control circuits, the electro-mechanical relays which were formerly used to connect and disconnect the starting winding have been replaced by semi-conductor switches. Commonly, one or more of these solid state switches are connected in series with the starting winding and are opened or closed depending upon the magnitude of a control signal which is developed by a current transformer serially connected with the main winding. As rotor speed increases, the current in the main winding drops, resulting in a decrease in the magnitude of the control signal applied to the switches. When the main winding current falls below a predetermined value, the switches are opened to de-energize the starting winding. Control circuits of the foregoing type are disclosed, for example, in U.S. Patent 3,071,717 which issued to J. F. Gordon on Jan. 1, 1963.

Although the semi-conductor switches used in the prior art arrangements are quite small, the required current transformer is sufficiently bulky to necessitate its mounting outside the motor case. To eliminate the need for a separate current transformer, it is a known practice to provide auxiliary control windings coupled to the main winding to produce voltages proportional to main winding current. Such an arrangement is shown in U.S. Patent 3,116,445 which issued to F. H. Wright on Dec. 31, 1963. Although such an arrangement eliminates the requirement for an external transformer, the additional windings increase the cost and complexity of the stator structure.

It is accordingly an object of the present invention to eliminate the requirement for additional transformer windings in a solid state starting circuit for single phase motors. It is a further object of the invention to provide an improved starting arrangement which is extremely inexpensive and compact.

Summary of the invention

In a principal aspect, the present invention takes the form of a switching circuit for connecting and disconnecting the starting winding of a single-phase induction motor and a source of alternating current energy in response to variations in the magnitude of current flowing through the motor's main winding. According to the principal feature of the invention, a current sensing impedance is connected in series with the main winding and the transconductive path of a solid state switching device is serially connected with the starting winding. Means are employed for converting the alternating current potential appearing across the series impedance into a direct-current control voltage which is applied to the gate electrode of the solid state switch to control the conductivity of the transconductive path. In a preferred embodiment of the invention, the serially connected impedance is a precision resistance and a diode and capacitor are connected in parallel with this resistance. A second resistance is connected from the diode-capacitor junction to the gate electrode of a single solid state switch capable of controlling the alternating current in the start winding circuit.

The resulting control circuit is quite small, since it does not require a transformer, and may therefore conveniently form an integral part of the motor structure.

Brief description of the drawing

These and other objects, features and advantages of the present invention may be more clearly understood through a consideration of the following detailed description. In the course of this description, reference will frequently be made to the attached drawings in which.

Description of the preferred embodiment

Figure 1:
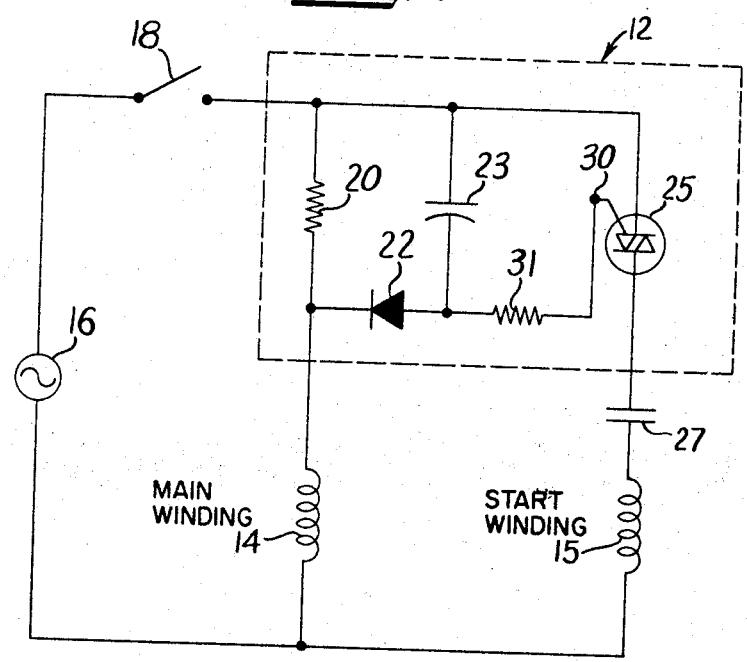
FIGURE 1 is a schematic diagram of the preferred control circuit according to the invention showing its interconnection with the main winding and start winding of an induction motor.

FIGURE 1 of the drawings shows a preferred starting circuit embodying the invention. This novel circuit is indicated within the dotted line 12 and is connected to operate a single-phase induction motor including a main winding 14 and a start winding 15. Operating power for the arrangement is obtained from a source of alternating current energy 16, one terminal of which is connected to the junction of main winding 14 and start winding 15. A switch 18 is serially connected with a resistance 20 between the other terminal of source 16 and one end of main winding 15. The series combination of a diode 22 and a capacitor 23 is connected in parallel with the resistance 20. Diode 22 is poled to conduct positive current from the capacitor 23 to the junction of resistor 20 and main winding 14. The transconductive path of a solid state switch 25 is connected in series with a phasing capacitor 27, the switch 18, and start winding 15 between the terminals of the source 16 and the control terminal 30 of switch 25 is connected to the junction of diode 22 and capacitor 23 by means of a resistor 31.

Figure 2:
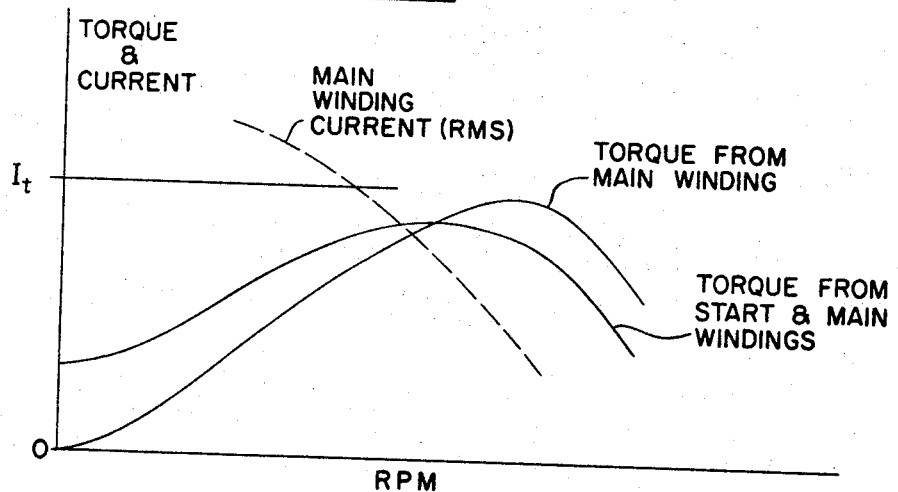
FIGURE 2 is a graph illustrating how torque and main winding current vary with changes in the rotational speed of the rotor.

FIGURE 2 of the drawings depicts the operating characteristics of a typical single-phase induction motor. When such a motor is first energized, the main winding does not, by itself, contribute starting torque to the rotor. The start and main windings, in combination, do however create sufficient torque to start rotation. As shown in FIGURE 2, the torque from the combined windings increases with motor speed until a predetermined rotational speed is reached, whereupon the torque begins to decrease.

After rotation begins, the main winding contributes an increasingly larger share of the total torque. Indeed, as can be appreciated from FIGURE 2, the start winding actually hinders rotation (i.e., supplies "negative torque") after a predetermined rotational speed is surpassed.

Thus, to obtain maximum performance from the motor, as well as self-starting capability, it is desirable to provide means for disconnecting the start winding from the voltage supply circuit as soon as a preselected speed is reached.

As shown in FIGURE 2, the magnitude of main winding current provides a convenient measure of rotor speed since main winding current exhibits a substantial decline as the motor is brought up to speed. In accordance with the present invention, a novel, transformerless control circuit is employed for translating the magnitude of the alternating current flowing in the main winding into a D.C. signal which is applied to the control electrode of a solid-state switching device capable of controlling the flow of alternating current in the start winding.

During positive half-cycles of the alternating current voltage supplied by source 16, positive main winding current flows through the resistance 20. The capacitor 23 is charged to approximately the peak value of the voltage appearing across resistance 20 through a charging path including the then forward-biased diode 22. On negative half-cycles, diode 22 prevents the discharge of capacitor 23 through the resistance 20 or through the main winding 14. A direct current voltage is accordingly developed across capacitor 23 which varies in direct proportion to the changes in the amount of alternating current flowing in main winding 14.

This D.C. control voltage is employed to control the conductivity state of the solid-state switch 25. Switch 25 preferably takes the form of an integrated, multifunction device such as the G.E. type ZJ257B "Triac." It is to be understood, however, that any appropriate device capable of controlling alternating current flow in response to changes in the magnitude of a single D.C. control signal may be employed.

As main winding current decreases to a threshold level, shown at $I_t$ in FIGURE 2, the control voltage developed across capacitor 23 becomes insufficient to maintain switch 25 in its former ON condition. The transconductive impedance of switch 25 thereupon rises abruptly to disconnect the start winding from the circuit.

Should the rotor speed decrease under heavy load, the main winding current may again rise above $I_t$. In that event, the control voltage across capacitor 23 again rises to a level sufficient to turn switch 25 ON in order to add the torque which the start winding contributes at slow speeds. The threshold level of main winding current at which the switch operates may be varied by altering the value of resistance 20.

It is to be understood that the specific embodiment of the invention which has been described is merely illustrative of one application of the principles of the invention. Numerous modifications may be made by those skilled in the art without departing from the true spirit and scope of the invention.

What is claimed is:
1. A circuit for controlling the operation of an induction motor having a start winding and a main winding energized by an alternating current energy source which comprises, in combination,
a semi-conductor switching device having a control electrode and a transconductive path,
circuit means for connecting said transconductive path in series with said start winding across said source,
a current-sensing resistor,
means for connecting said sensing resistor in series with said main winding across said source,
means for translating the magnitude of alternating current voltage developed across said sensing resistor into a direct current control signal whose magnitude varies in direct relation to the magnitude of said alternating current voltage, and
means for applying said direct current control signal to said control electrode of said switch whereby the conductivity of said transconductive path is controlled in response to fluctuations in the magnitude of current flowing in said main winding.
2. A circuit as set forth in claim 1 wherein said translating means comprises the series combination of a diode and a capacitor connected in parallel with said sensing resistor and a second resistor connected between said control electrode and the junction of said capacitor and said diode.
3. A circuit as set forth in claim 2 wherein said semiconductor switch is an integrated, multifunction device capable of controlling the flow of alternating current through said transconductive path in response to changes in the magnitude of said direct current control signal.

References Cited

UNITED STATES PATENTS

| | | | |
|---|---|---|---|
| 3,071,717 | 1/1963 | Gordon | 318—221 |
| 3,116,445 | 12/1963 | Wright | 318—220 |
| 3,226,620 | 12/1965 | Elliott et al. | 318—221 |
| 3,307,093 | 2/1967 | Wright | 318—221 |

OTHER REFERENCES

Using the Triac for control of AC power, S. H. Galloway, General Electric application note, March 1966, p. 16.

ORIS L. RADER, *Primary Examiner.*

G. RUBINSON, *Assistant Examiner.*